United States Patent [19]

Trousset et al.

[11] Patent Number: 5,241,471
[45] Date of Patent: Aug. 31, 1993

[54] METHOD OF MULTI-SCALE RECONSTRUCTION OF THE IMAGE OF THE STRUCTURE OF A BODY AT AN INCREASED SPEED

[75] Inventors: Yves Trousset, Paris; Anne Rougée, Chatenay-Malabry; Didier Saint-Felix, Boulogne, all of France

[73] Assignee: General Electric CGR S.A., Issy les Moulineaux, France

[21] Appl. No.: 630,228

[22] Filed: Dec. 19, 1990

[30] Foreign Application Priority Data

Dec. 20, 1989 [FR] France ............................... 89 16906

[51] Int. Cl.⁵ .............................................. G06F 15/42
[52] U.S. Cl. ........................... 364/413.19; 364/413.18; 364/413.13
[58] Field of Search ...................... 364/413.13, 413.14, 364/413.15, 413.16, 413.17, 413.18, 413.19, 413.22; 395/12, 124, 128; 340/728; 382/50, 54

[56] References Cited

U.S. PATENT DOCUMENTS

| | | | |
|---|---|---|---|
| 4,602,348 | 7/1986 | Hart | 364/581 |
| 4,682,290 | 7/1987 | Tan et al. | 364/413.18 |
| 4,751,643 | 6/1988 | Lorensen et al. | 364/413.13 |
| 4,791,567 | 12/1988 | Cline et al. | 364/413.13 |
| 4,821,213 | 4/1989 | Cline et al. | 264/313.13 |
| 4,835,712 | 5/1989 | Drebin et al. | 395/124 |
| 4,866,612 | 9/1989 | Takagi et al. | 364/413.22 |
| 4,868,764 | 9/1989 | Richards | 395/128 |
| 4,879,668 | 11/1989 | Clire et al. | 364/413.18 |
| 4,914,589 | 4/1990 | Crawford | 364/413.17 |
| 4,931,959 | 6/1990 | Honda et al. | 395/128 |
| 4,952,922 | 8/1990 | Griffin et al. | 364/522 X |
| 4,984,157 | 1/1991 | Cline et al. | 364/413.13 |
| 4,984,160 | 1/1991 | Saint-Felix et al. | 364/413.19 |
| 4,985,834 | 1/1991 | Cline et al. | 364/413.22 |

FOREIGN PATENT DOCUMENTS

0318291  5/1989  European Pat. Off. .

Primary Examiner—Donald E. McElheny, Jr.
Assistant Examiner—A. Bodendorf
Attorney, Agent, or Firm—Nilles & Nilles, S.C.

[57] ABSTRACT

In order to reconstruct the structure of a body by way of iterative algorithms, the first iterations are carried out with lower resolution in order to limit the number of calculations. The image can then be reconstructed when the calculation time is reduced to one-third or even one-quarter. The image thus reconstructed is of better quality than images reconstructed using only a single resolution.

13 Claims, 3 Drawing Sheets

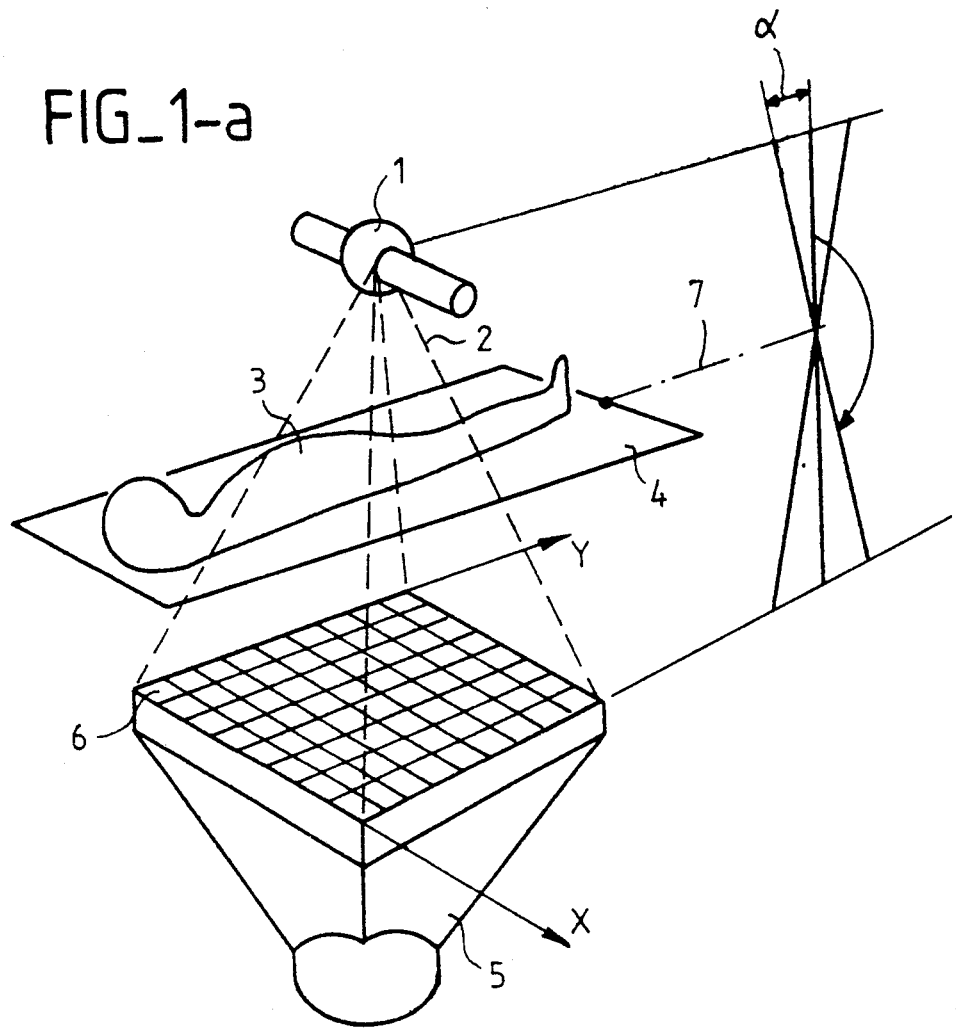
FIG_1-a
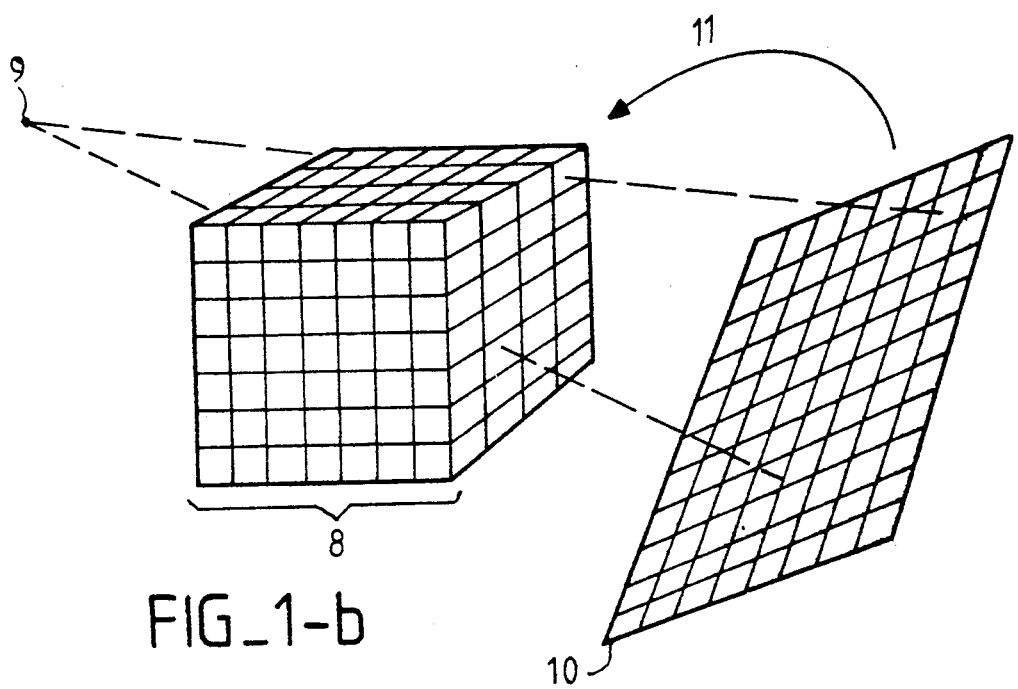
FIG_1-b

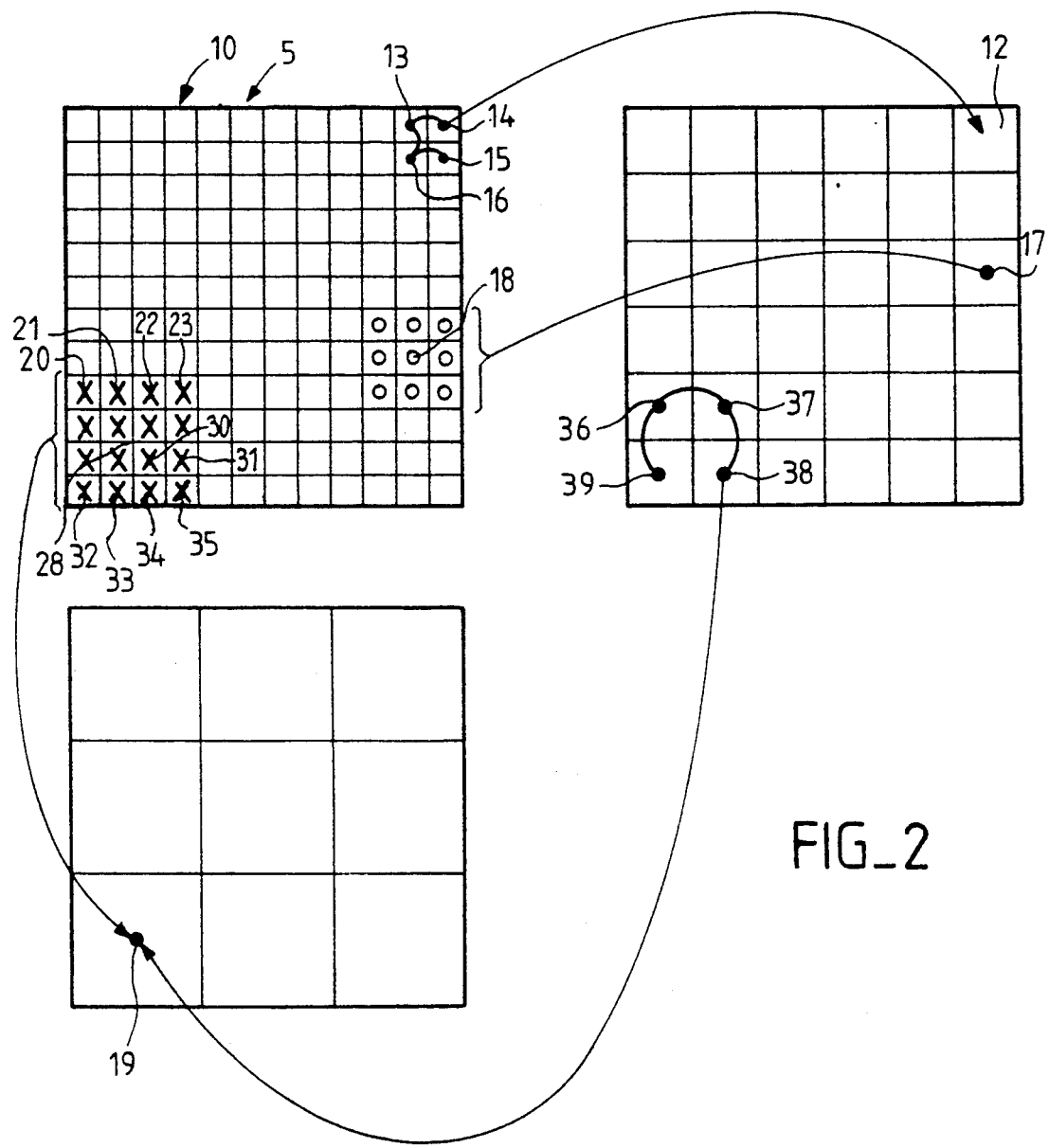
FIG_2

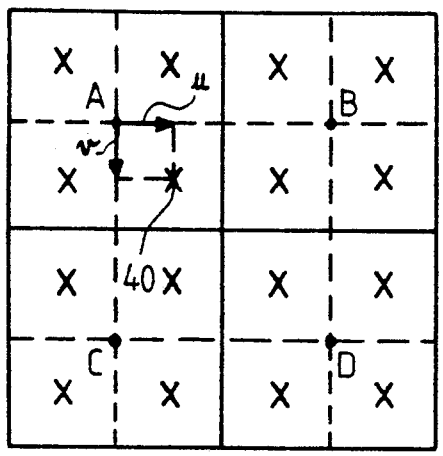
FIG_3-a
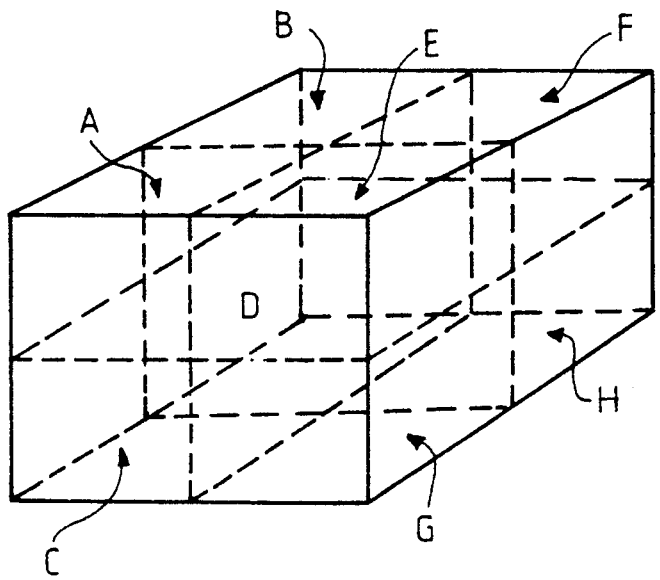
FIG_3-b
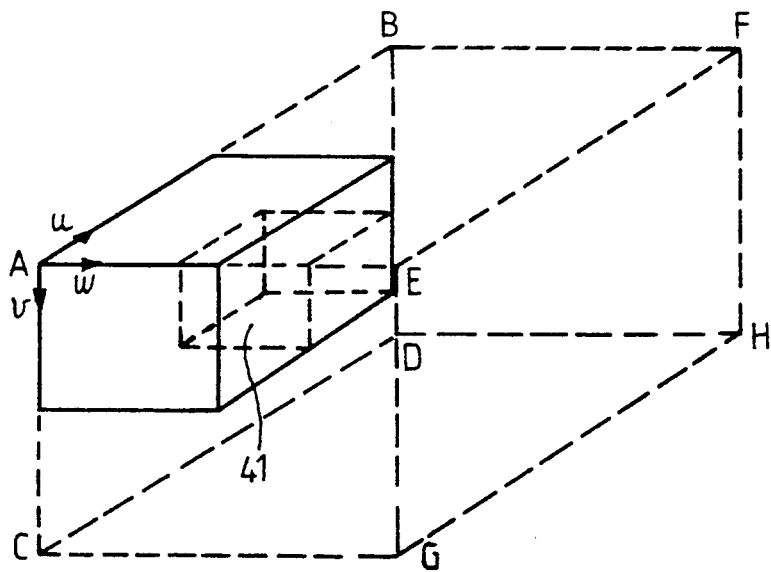
FIG_3-c

METHOD OF MULTI-SCALE RECONSTRUCTION OF THE IMAGE OF THE STRUCTURE OF A BODY AT AN INCREASED SPEED

BACKGROUND OF THE INVENTION

1. Field of the Invention

The present invention relates to a method of multi-scale reconstruction of the image of the structure of a body. The invention is more particularly applicable to the medical field in the reconstruction of the internal structures of patients under examination. Potential applications can nevertheless be found in other fields, especially in nondestructive industrial testing in which examinations of the same type as medical examinations are performed. The aim of the method in accordance with the invention is to increase the speed of three-dimensional reconstruction when the reconstruction algorithms are iterative algorithms.

2. Description of the Prior Art

Acquisition protocols employed in medicine for determining the internal structures of a body are already known. These protocols are essentially of the following types: tomodensitometry, NMR, ultrasonics, scintigraphy. In these protocols, parts of a patient's body are subjected to an examination. This examination involves several series of measurements in order to make it possible, for example, to reconstruct and display the three-dimensional image of the internal structure of the body. Each series is distinguished from another by the modification of a parameter of the series of measurements or of the experimentation. In tomodensitometry, for example, the parameter concerns the orientation of the tomodensitometer. IN NMR, the parameter may concern the value of a section-selection gradient pulse. In all cases, several series of results of measurements are thus acquired. Each series is representative of the body and of the corresponding configuration of the experimentation characteristic.

In order to reconstruct from series of measurements the three-dimensional image of internal structures under examination, there essentially exist two types of reconstruction algorithm in x-ray imaging. A first type is concerned with a calculation involving back-projection and filtering or else reconstruction by multidimensional Fourier transform. A second type with which the invention is concerned relates to the iterative methods of reconstruction also known as algebraic methods. This second type finds a particular application in tomodensitometry because the utilization of algorithms of the first type leads to unstable solutions in the event of volume reconstruction from a small number of views. The principle of an algebraic algorithm of this type, an improvement of which was described in a French patent Application filed by the present Applicant on Jan. 20, 1989 under No. 89 00676, is described below.

The initial step consists in estimating a priori the shape of the structure of the body under examination. This means that, in the case of all the volume elements or voxels of said body under examination, it is considered that the value of the physical property tested by the experimentation has a known value such as 0, for example. This theoretical object (which in no way resembles the object the property of which is sought to be determined is then subjected mathematically to a series of experiments which are similar to those to which the body to be examined has really been subjected. The simulation thus performed also leads to several series of "measurements" designated as reprojections, for example, of the (false) theoretical object in accordance with the same configurations of the experimentation characteristic. A comparison is then made between the series of measurements and the series of reprojections and, in the respective series, between each pair of values so as to deduce from the deviation which is found a corresponding modification of the value of the physical quantity in the voxel concerned. The theoretical estimation of said object is modified accordingly.

The next step consists in reiterating this experimentation simulation operation and in also reiterating the comparison of the reprojection series newly obtained with the same series of measurements really measured in the body. A second deviation is deduced therefrom and used to remodify the knowledge of the body structure which had previously been obtained. Thus in a sequence of operations, the estimation of the three-dimensional image of the body structure is refined.

It should be indicated that the real measurements are acquired with a given resolution and that the reconstruction of the image of the body will also be performed with a given resolution. In order to ensure that the resolution of the measurements and the resolution of reconstruction may be clearly differentiated, this latter will be referred-to hereinafter as a fineness of reconstruction. It is known that the resolution of the measurements at the moment of acquisitions leads in correspondence to a significant fineness of reconstruction of the body under examination. A fineness is significant if it really corresponds to a knowledge which is as accurate as possible, taking into account the resolution of the measurements performed. In fact, if the image of a structure is known in accordance with a given fineness and is expressed with a greater degree of fineness by means of any suitable methods of enlargement, its significant fineness is not increased. In the final analysis, one only makes use of the information acquired. This can be compared with the grain of a positive photographic print which can never have a resolution higher than the grain of the negative employed for taking the photograph, irrespective of the enlargement techniques employed.

As can readily be understood, practitioners endeavor to determine the images of the structures being studied with the greatest possible fineness. When conducting experiments, this automatically involves the need to carry out series of measurements with the highest possible resolution. The disadvantage of high resolution and a high degree of reconstructed fineness lies in the duration of the reconstruction calculations which have to be contemplated. This is particularly true in the case of iterative methods in which the calculations are undertaken several times, usually at least twice.

In the invention, this problem of duration of calculations is solved while noting that, in the case of the first iterations, it is not necessary to perform the calculations either with very high resolution or with a very high degree of fineness. In fact, the deviations evaluated during the first iterations are so substantial that they do not need to be evaluated very accurately. It is apparent, for example, that it is not necessary to determine up to the third decimal point the value of a physical quantity measured in a voxel when it is known that the result may already be erroneous at the first decimal point. However, the invention is not concerned with the floating character of this precision which, on close scrutiny, would not result in a significant reduction of calculation times. In conventional practice, the iteration operations in fact involve series of multiplications and additions, the elementary time duration of which is unrelated to the bit number to be processed. There is in fact a continuous parallel processing operation. This time-duration is rather related to the fact that these operations have to follow each other. Thus a following operation uses as arguments the results of a preceding operation.

It has been observed in accordance with the invention that, in the case of the first iterations, it was not necessary to express the reconstructed volume with the final degree of fineness but that, on the contrary, it was possible to use a lower degree of fineness than the final fineness. At the same time, a lower resolution of measurements than the final resolution is employed. The term "final" is attributed to the highest fineness in which the practitioner then desires to see the images. For the resolution of measurements, the final resolution is that which is employed last in the calculations (it is also the resolution really acquired during experiments). In other words, instead of endeavoring to express values of physical quantities in each voxel of the structure, it is endeavored to represent this structure by macro-voxels during preliminary iterations. Before carrying out the final iterations, these macro-voxels are converted by means of an enlargement operation (zoom) to voxels distributed with the final degree of fineness. As will be readily apparent, measurements with lower resolution are employed for calculation of physical quantities at the level of the macro-voxels.

SUMMARY OF THE INVENTION

The invention is therefore directed to a method of multi-scale reconstruction of the image of a structure of a body in which
- there are carried out with a first given resolution series of measurements of at least one physical property attached to volume elements or voxels of the body with a particular configuration of a characteristic of a given protocol in the case of each series and by changing the configuration of said characteristic of said protocol from one series to another,
- series of measurement results are thus acquired, each series being representative of the body and of the corresponding configuration of said characteristic, and an image of the body structure is reconstructed iteratively by making use of a reconstruction algorithm of iterative type with which a new image of the body structure is deduced more exactly from one iteration to another by carrying out the reconstruction treatment on the one hand on the basis of the series of measurements and on the other hand on the basis of a preceding image of said structure,
- said image is composed of a collection of image elements, each image element contains a first item of information which is representative of the location of a voxel in the body and a second item of information which is representative of the value of said physical property in said voxel, and said image elements are distributed with a given fineness which depends on said given resolution, the method being distinguished by the fact that
- there are employed for at least one given iteration measurement data corresponding to a resolution which is lower than said given resolution, and an image of the structure with a fineness which is lower than the given fineness, and that
- for a following iteration, the image of the structure with said lower fineness is converted beforehand to an image of the structure with higher fineness than said lower fineness, and measurement data corresponding to a higher resolution than said lower resolution are employed in correspondence.

In a preferred manner, in order to change from the measurement results of a final resolution (acquired from the outset) to a lower resolution, an averaging operation is performed. This average can even be weighted by a smoothing function such as a Gaussian function, for example. Moreover, at the moment of conversion of the image of the structure with lower fineness to an image of the structure with higher fineness, a trilinear interpolation is preferably carried out. It will be shown that this technique of averaging on the one hand and of trilinear interpolation on the other hand leads in the first place to removal of reconstruction noise which would naturally have been obtained with the other methods of reconstruction. Said technique leads in the second place, and paradoxically, to a more precise representation than that which would be obtained with a traditional reconstruction calculation in which the iterations would have been made each time on the highest fineness and resolution. This superior result is attributed to the averaging and interpolation operations which have the effect of smoothing the images and naturally removing noise.

In consequence, the method of the invention is not only faster but makes it possible to achieve a better result on certain types of objects (having greater smoothness).

BRIEF DESCRIPTION OF THE DRAWINGS

FIGS. 1a and 1b are schematic representations of one example of a mode of acquisition and of a mode of reconstruction of images in which the method of reconstruction of the invention is employed.

FIG. 2 is the schematic representation of averaging operations known also as sub-sampling operations, resulting in lower resolutions of the series of measurements acquired.

FIGS. 3a, 3b and 3c are schematic representations of a preferred mode of increase in fineness in which the values of the voxels contained in the macro-voxels are determined by trilinear interpolation.

DETAILED DESCRIPTION OF THE INVENTION

FIGS. 1a and 1b show in an example of densitometry the conditions of acquisition of series of measurement results and the reconstruction of images which has to correspond to this acquisition in volume. The example indicated here corresponds to a densitometry application in which the invention is particularly useful. However, the method in accordance with the invention is also applicable to other techniques such as those indicated at the beginning of this description. FIG. 1a shows a mode of acquisition. FIG. 1b shows a mode of reconstruction. At the moment of a densitometry acquisition, an x-ray tube 1 emits an x-radiation 2 towards the body 3 of a patient who is placed on a patient support panel 4. A detector 5 of the two-dimensional type is placed on the other side of the body 3 with respect to the x-ray tube 1. Detector 5 has a plurality of detecting cells such as the cell 6 arranged on a surface, for example in a matrix array, in two directions X and Y. The x-ray tube 1 and the detector 5, which are maintained in rigidly fixed relation to each other, are capable of rotating about an axis 7 which passes substantially through the center of the patient 3. The positions of this assembly in rotation are indicated by an angle α. Results of radiological measurements can be acquired within each cell 6 at each position of the assembly consisting of x-ray tube 1 and detector 5. A series of measurement results is therefore acquired at each position.

The protocol indicated here is therefore a densitometry protocol and the characteristic which governs the series of results is the value of the angle α which indicates the orientation of the x-ray tube 1-detector 5 assembly with respect to the body 3. As soon as an acquisition has been made, this assembly is rotated through an elementary angle and the acquisition is begun again, a second series of measurement results being thus obtained. In this sequence of operations, the body 3 is subjected to irradiations oriented in a series of directions distributed over at least a semicircle. In particular as described in the French patent Application cited earlier, it is known that such a series of acquisitions permits reconstruction of an image which is representative of conditions within the body 3 at the location at which the x-rays 2 have passed through the body.

FIG. 1b represents the algorithm of reconstruction by iteration which is employed in the invention. In an algorithm of this type, one makes the assumption of a priori knowledge of the image of the structure of the body 3. This image 8 contains a set of voxels each loaded to the value of a physical quantity. In this algorithm, the image 8 is subjected by simulation to irradiation from a focal point 9 located at a distance comparable with the distance between the position of the focus of the x-ray tube 1 and the body 3. When subjected to this theoretical irradiation, the three-dimensional image 8 of the structure is projected in a two-dimensional image 10 onto a detection plane which occupies a position corresponding to that of the detector 5 with respect to the body 3. The simulated detector 10 comprises detection elements comparable with the cells 6 of the detector 5. One compares series by series and from cell to element within each series the values of the physical quantities involved on the one hand in the measurements really acquired and on the other hand in the simulated reprojections. A new three-dimensional simulated image 11 is deduced therefrom. This latter is then substituted for the old image 8 of the structure of the body 3. In other words, the image 11 of the structure of the body 3 is produced from a knowledge of the old image 8 of the structure of the body 3 and from the value of the difference between the theoretical projection 10 of said structure 8 and the results of detection within the cells 6. This is the principle of algebraic reconstruction algorithms such as that of the patent Application cited earlier.

It is readily apparent that the fineness with which it is possible to describe the image 8 of the structure of the body 3 is totally dependent on the resolution of the elements for detection of the surface 10 and also on the resolution of the cells on the detector 5. In one example in which the detector 5 is composed of 256×256 cells, it can be shown that the structure 3 can be reconstructed with significant fineness in a volume with 256×256×256 voxels if 256 acquisitions have also been made. Normally, at the moment of iterations, the reconstruction calculations and comparisons must be performed in the case of each of these $256^3$ voxels.

In the invention, rather than performing a calculation on such a large number of voxels, recourse is had to a simplification. The principle of this simplification is illustrated in FIG. 2. In FIG. 2, there is shown diagrammatically in the top left diagram the distribution of the detection cells 6 of the detector 5. These cells correspond to the detection image elements of the simulated detector 10. These cells and elements are distributed with a resolution of 256×256 in one example.

In the invention, it is decided to reconstruct an image of the structure 3 having a fineness which will be only $128^3$ instead of $256^3$. In this case, a lower resolution of the measurements is employed in correspondence. In this example, the lower resolution is even one-half. To this end, detection macro-cells such as the macro-cell 12 (at the top right) are accordingly defined. In respect of each of the 256 orientations of the assembly consisting of x-ray tube 1 and detector 5 with respect to the body 3, one measurement macro-result is assigned to said macro-cell 12 of the lower-resolution detector 5. This macro-result is a combination of the results of measurement in the cells 13 to 16 contained in the macro-cell 12. The fact of establishing this average value thus results in smoothing, the beneficial effects of which have already been indicated. It is nevertheless possible to define a larger neighborhood for determination of the macro-result assigned to a macro-cell. It is possible, for example, to take the measurement results in a group of nine cells of the detector 5 as is the case with the macro-cell 17. In the event that the number of cells of the neighborhood on the detector 5 is odd-numbered, the center of the macro-cell will be in exact correspondence with the center of the central cell 18 around which the neighborhood has been established. This may also lead to simplifications in calculation. Moreover, it is possible to choose a neighborhood of determination of the macro-result (on sixteen cells, for example) which is different from the group (13 to 16) of cells which define a macro-cell.

Irrespective of their mode of combination, the macro-cells 12 and 17 are in any case all calculated in the same manner at a given level of calculation.

It has been mentioned earlier that it could prove useful to carry out at least two iterations. Taking account of the fact that it is sought to acquire final knowledge of the image with a fineness of $256^3$, one may choose to achieve a situation with even lower resolution, with 64 macro-macro-elements or else 64 macro-macro-cells instead of 128 macro-elements or macro-cells. At the level 64, the information possessed by a macro-macro-element is the average value of the results of measurements of physical quantities in an even larger neighborhood. For example in the macro-macro-element 19 (at the bottom left) of the level of resolution 64, we have a combination of the results in sixteen cells 20 to 35.

In a simple example, the combination of the sixteen results of the cells 20 to 35 is an average value. It can even be said in this case that the value assigned to the macro-macro-element 19 of level 64 is the average value of four macro-elements of level 128: the elements 36 to 39. In this case the sub-sampling operation to which the measurements have to be subjected in order to reduce the fineness and resolution twice can comprise the averages on four cell-elements of the detector 5, then the averages on four neighboring macro-cell-elements.

However, in order to calculate the value to be assigned to the macro-macro-elements 19 of level 64, it is possible to carry out weighting by a smoothing function such as a Gaussian function, for example, of the results of measurement of the physical quantities in the cells 20 to 35. This weighting operation can accordingly be of the following type:

$$(1/\sqrt{2\pi\sigma^2}) \cdot \exp(-r^2/2\sigma^2)$$

In this expression, r represents the distance between the center of the macro-macro-element 19 and each cell 20 to 35 (its vicinity). The value $\sigma$ is a standard deviation value fixed as a parameter. A good value of $\sigma$ is such that the width at mid-height of the Gaussian function is equal to the size of the cell.

At this stage of the explanation, it may be assumed that one knows three groups of series of measurement. In a first group, there are all the series of final measurements (those which are in fact measured at the outset). The number of these series is equal to the number of angles $\alpha$ of scanning of the body 3. In a second group, the measurements have been composed so as to be distributed in accordance with the macro-elements at level 128. In this case also, one can have the same number of series. In the third group, there are the same series of measurements in correspondence with the first two groups but for macro-macro-elements of the level 64. From one group to the other, the resolution is progressively lower (more and more coarse).

In accordance with the invention, the reconstruction is begun by carrying out an iteration with the $64^2 \times 256$ macro-macro-elements 19 of level 64. There is obtained in this case an image of lower fineness containing $64^3$ macro-macro-voxels. All the acquired 256 images in projection are thus employed. A smaller number may nevertheless be taken. For example, it is possible to take one image out of two (at level 128) or even one out of four (at level 64).

It would have been possible to calculate the image at level 64 without engaging in the combination and averaging operations mentioned earlier. However, if one proceeds in this manner, small details will be lost and a half-tone image pattern is liable to appear as noise in the final image.

Once an iteration or even several iterations have been undertaken at level 64, it may be decided to carry out a following iteration at level 128. It is necessary in this case to convert the image of the structure 3 with a fineness of $64^3$ macro-macro-voxels to an image with a fineness of $128^3$ macro-voxels. A simple solution would consist in assigning to each macro-voxel in a higher fineness the values retained for the macro-macro-voxels of the lower level. However, as in the case of the averaging operations, this practice results in artifacts in the representation. In consequence, an interpolation of the trilinear type, for example, is made on the macro-macro-voxels in the vicinity of each macro-voxel in order to determine its value.

FIGS. 3a to 3c make it possible to understand the calculation of the trilinear interpolation. In order to simplify, FIG. 3a shows the principle of calculation of a bilinear interpolation. In this latter, starting from a knowledge of values in image elements A, B, C, D corresponding to a rough representation, it is sought to determine values to be assigned to image sub-elements marked by crosses and more finely distributed. In the case of each of these image sub-elements such as the sub-element 40, for example, its coordinates u, v are measured in a reference frame centered on one of the image elements such as the element A, for example. One then calculates the term:

$$a \cdot (1-u) \cdot (1-v)$$

In this expression, 1 is the value of the image element A. One calculates the same expression relating to the sub-element 40 but applied to each of the other elements B, C and D. These four terms are added in order to obtain the image value of the sub-element 40. It is observed that these calculations are simplified since u and v can assume only values equal to $\frac{1}{4}$ and $\frac{3}{4}$ of the distance AC between two image elements.

FIG. 3b shows the knowledge acquired in regard to the image of the structure of the body 3 after an iteration at a lower level, for example at level 64. This figure shows the centers A to H of eight image or voxel macro-macro-elements of said image. FIG. 3c shows the knowledge which one would like to have, in intermediate macro-voxels such as 41, of the image of the structure of the body 3 at a fineness level such as 128, for example, which is higher than that of the previous level. The trilinear interpolation under consideration utilizes the coordinates u, v, w of the centers of each image macro-element 41 with respect to systems of axes centered on each of the image macro-macro-elements at the level of the lower fineness, for example of A. The value to be assigned to the image macro-element 41 is then equal to the sum of terms such as:

$$a \cdot (1-u) \cdot (1-v) \cdot (1-w)$$

in which a represents the value determined during preceding iterations in the case of the macro-macro-voxel A.

It is noted that, in the present invention, multiple iteration calculations, with high fineness and with high resolution, have been replaced by the calculation of iterations which finally result in an increase in fineness and resolution, and also on the one hand by average calculations and on the other hand by trilinear interpolation calculations. It will now be shown that the time of calculation of these averages and of these interpolations is negligible.

It is known for example that, in the case of a voxel with the algorithms of algebraic type, and at each iteration, there are approximately forty operations to be performed per projection. The total number of operations is therefore, in the case of a given iteration, directly proportional to the number of voxels $64^3$, $128^3$ or $256^3$. In one example, and in order to fix ideas, an iteration at 128 followed by an iteration at 128 is replaced by an iteration at 64 followed by an enlargement of 64 at 128 and by an iteration at 128. If the number of projections in the series is designated as $n_p$ and the number of voxels is designated as $n_v$, it may be stated that an iteration at a given level (64, for example) leads to a number of operations equal to $2 \times 40 \times n_p \times n_v$. On the other hand, iteration at a higher level (for example at 128) leads to a number of operations equal to $2 \times 40 \times n_p \times n_v \times 8$. In fact, since there are eight times more voxels at 128 than there are at 64, there are eight times more calculations.

To simplify, it can be assumed that there are on an average less than six addition or multiplication operations in order to determine the value in one image macro-element 41 by trilinear interpolation when the value in eight neighboring macro-macro-elements A to H is known. The total number of operations which are necessary in order to effect the enlargement is accordingly equal to $6 \times n_v \times 8$. In fact, this number is proportional to eight times the number of macro-macro voxels. A rapid calculation shows that an iteration at 64 followed by an enlargement produces a number of operations which is wholly negligible with respect to the number of operations with two iterations at 128.

In other words, in accordance with the invention, an iteration at 64 and an iteration at 128 are performed during a calculation period substantially equal to an iteration at 128. It is thus clearly shown that a saving of time is achieved in a ratio of 2:1. In practice, there is a first iteration at 64 in order to determine an image having a fineness of $64^3$. By interpolation, an image having a fineness of $128^3$ is deduced. An iteration at 128 will be performed on said image of fineness $128^3$. After iteration at 128, an image having a fineness of $256^3$ is deduced by enlargement. The last iteration is performed on said image of fineness $256^3$. The calculation time is accordingly that of the last iteration alone. The total time is thus considerably reduced for the same quality of image.

If the method of trilinear interpolation were not adopted, it would also be possible to assign the value a retained for A to each macro-voxel 41 which belongs to the neighborhood of a macro-macro-voxel A. In this case, however, there is observed a paving phenomenon between the macro-voxels of the neighborhood of A and those of the neighborhood of B. This phenomenon appears as an artifact in the image in a manner which is similar to sub-sampling without the average. A solution other than trilinear interpolation (weighted by a Gaussian function, for example) can again be contemplated.

Furthermore, the algebraic methods of reconstruction offer another advantage. They make it possible to determine a support for the object to be reconstructed and displayed. The essential object of this determination is to limit the calculation of the image of the structure of the object to image elements corresponding only to locations of portions of said object which are of interest. For example, in the human body and in angiography, only the vascular tree is reconstructed and not the surrounding tissues. To this end, the initial step consists in defining a support for the object. In fact, these structures are "hollow" structures and it is unnecessary to calculate the values of the surrounding structures since they are subsequently eliminated during an operation of visual display of the reconstructed structure. It is known to provide rapid definition of an object-supporting region, especially as disclosed in French patent Application No. 88 17001 filed on Dec. 22, 1988 by the same Applicant.

The question which then arises in the invention is to determine how the support is to be defined, taking account of the fact that, in the first iterations, a lower degree of fineness of the image 8 of the structure 3 is employed. Accordingly, it has become apparent that, in order to define the support for a low degree of fineness, it is necessary to use the knowledge of the support for a high degree of fineness. In consequence, all the macro-voxels which may even contain only one voxel of the image defined with high fineness ($256^3$) must be considered as belonging to the support having a lower degree of fineness ($128^3$). In fact, if a support were calculated specifically at each fineness level (64 or 128), there would be a risk of eliminating, for the first iterations, image element contributions which could never be correctly incorporated in the calculation thereafter.

Moreover, it has been realized that it is a great advantage to carry out image treatments on the intermediate images (with a lower degree of fineness). In fact, when it is desired to use an image, it is endeavored to remove noise from this latter, in particular for the purpose of visual display. The different processing techniques which permit this improvement consist in filtering the image elements or else in segmenting the image. In the case of filtering, there is assigned to a volume element a physical quantity having a value which is dependent on its own value and also on the intrinsic values assigned to the neighbors of said volume element. In the case of segmentation, there are eliminated from the structure those volume elements in which the value of the physical quantity is too low (related to noise) or in other words belongs to an uninteresting range of values (elimination of soft tissues in certain bone representations, for example).

Among the filtering processes are distinguished on the one hand the linear filtering processes and on the other hand the nonlinear filtering processes. For example, linear filtering by smoothing or averaging can promote the reconstruction of smooth structures having portions with a density which varies slowly or even which is constant. In another example, nonlinear filtering will to the contrary promote the reconstruction of objects in the structure having values of physical quantity which do not belong to interpenetrating value ranges. The value ranges are without continuum with respect to each other.

When a segmenting operation is performed, one removes from the supporting region of the structure all the volume elements of said structure in which the value of the measured physical quantity departs from a predetermined range.

All these processing operations, when they are performed on the intermediate images having a lower degree of fineness, result in savings of time in the processing operation itself and in the reconstruction. The saving of time in the processing operation is related to the fact that a smaller number of volume elements are processed with a lower fineness than with higher fineness. The saving of time in reconstruction is related to the fact that, after intermediate segmentation, there are less volume elements to be reconstructed (therefore less calculations) than if the segmentation is carried out on the entire reconstructed object. It could be shown with the invention that the time cost of these intermediate processing operations is amply compensated by the savings of time in the final processing operations.

What is claimed is:

1. A method of multi-scale reconstruction of a simulated image of a structure of a body to create a reconstructed image, said method comprising:
    irradiating the body to obtain multiple series of measurements, with a first designated resolution, of at least one physical property attached to volume elements or voxels of the body with a particular configuration of a characteristic of a given protocol in each series and by changing the configuration of said characteristic of said protocol from one series to another, series of measurements are thus acquired, each series being representatives of the body and of a corresponding configuration of said characteristic;

iteratively reconstructing the simulated image of structure of the body to create the reconstructed image of the structre of the body, by making use of a reconstruction algorithm with which a new image of the structure of the body is deduced more exactly from one iteration to another by carrying out the reconstruction of each image on the basis of the series of measurements and on the basis of a preceding image of the structure of the body; and displaying the reconstructed image of the structure of the body; wherein said reconstructed image of the structure of the body is composed of a collection of image elements, each image element contains a first item of information which is representative of a location of a voxel in the body and a second item of information which is representative of a value of said physical property in said voxel, and said image elements are distributed with a first designated fineness which depends on said first designated resolution, there are employed for at least one given iteration measurement data corresponding to a second designated resolution which is lower than said first designated resolution, and a first image of the structure of the body with a second fineness which is lower than the first designated fineness, and wherein, for a following iteration, 1) the first image of the structure of the body with said second fineness is converted to a second image of the structure of the body with a higher fineness than said second fineness, and 2) measurement data corresponding to a higher resolution than said second resolution are employed.

2. A method according to claim 1, wherein the protocol is an x-ray densitometric protocol, the characteristic relates to an orientation of a densitometer which serves to utilize said x-ray densitometric protocol, the configuration relates to a value of an angle of orientation of said densitometer with respect to a reference related to the body, the series of measurements comprise series of radiological acquisitions during which the structure of the body is projected in a two-dimensional projection onto a two-dimensional detector having detecting cells distributed in accordance with said first designated resolution, the reconstructed image of the structure of the body is a three-dimensional image, and wherein the method of reconstruction is of an algebraic type.

3. A method according to claim 2 wherein, for the second designated resolution of the measurement data, one chooses to consider as a measurement result, at each projection, a combination of measurement results in cells which are adjacent to each other, said combination being assigned to a macro-cell which is representative of said adjacent cells.

4. A method according to claim 3, wherein the combination is an arithmetical average.

5. A method according to claim 4, wherein the combination is average weighted by a smoothing function.

6. A method according to claim 1, wherein, in order to convert the first image of the structure of the body to the second image of the structure of the body, macro-elements of the second image of the structure of the body are created by carrying out a trilinear interpolation of values of said physical property between neighboring macro-macro-elements of the first image of the structure of the body.

7. A method according to claim 1, wherein the iterative reconstruction is limited to a supporting region of the structure of the body detected as a function of the higher fineness.

8. A method according to claim 1, wherein the ratios of higher and lower finenesses and resolutions are multiples of 2.

9. A method according to claim 1 wherein, prior to an iteration which follows a given iteration, an image of the structure of the body having a lower fineness is processed so as to improve the quality of the reconstruction.

10. A method according to claim 9 wherein for the processing operation, the volume elements of the image of the structure of the body having the lower fineness are filtered by smoothing so as to improve the reconstruction of a physically smooth object.

11. A method according to claim 9 wherein for the processing operation, the volume elements of the image of the structure of the body having the lower fineness are filtered by nonlinear smoothing in order to preserve contours and to improve the reconstruction of objects in the structure in which the values of the physical property belong to differentiated ranges without any common portion.

12. A method according to claim 9 wherein for the processing operation, the volume elements of the image of the structure of the body having the lower fineness are segmented so as to remove from a supporting region of the reconstructed image of the structure of the body all volume elements in which a value of a physical quantity is related to noise.

13. A method according to claim 1, wherein said step of displaying comprises visually displaying the reconstructed image of the structure of the body.

* * * * *